2 Sheets—Sheet 1.
E. J. KNOWLTON.
COMBINED HAY RAKES AND TEDDERS.
No. 181,184. Patented Aug. 15, 1876.
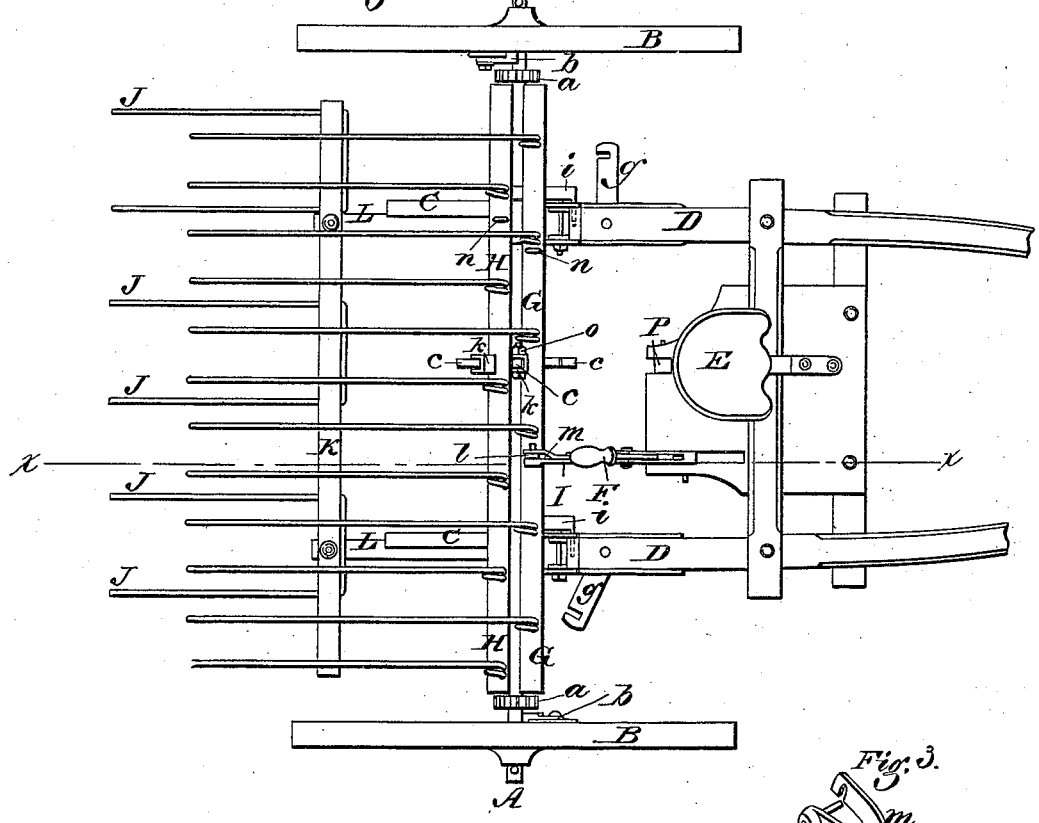
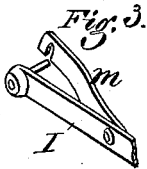
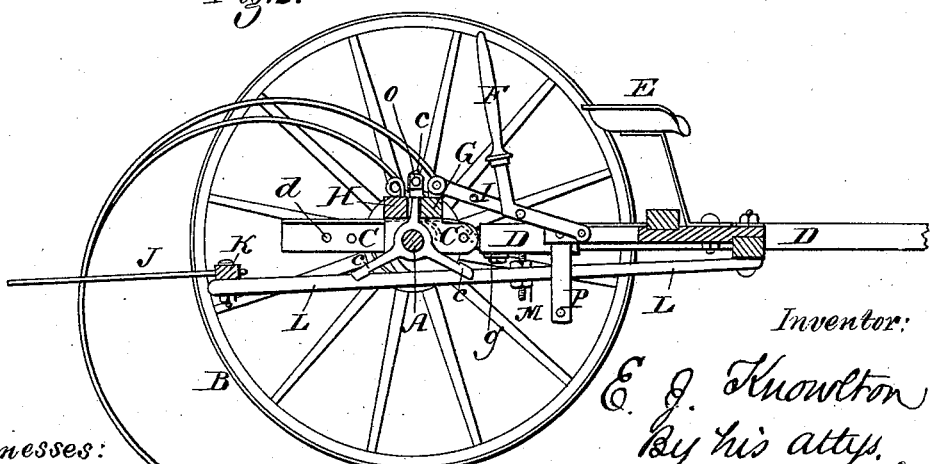
Witnesses:
Will N. Dodge
Donn P. Twitchell
Inventor:
E. J. Knowlton
By his attys.
Dodge & Son 2 Sheets—Sheet 2.
E. J. KNOWLTON.
COMBINED HAY RAKES AND TEDDERS.
No. 181,184. Patented Aug. 15, 1876.
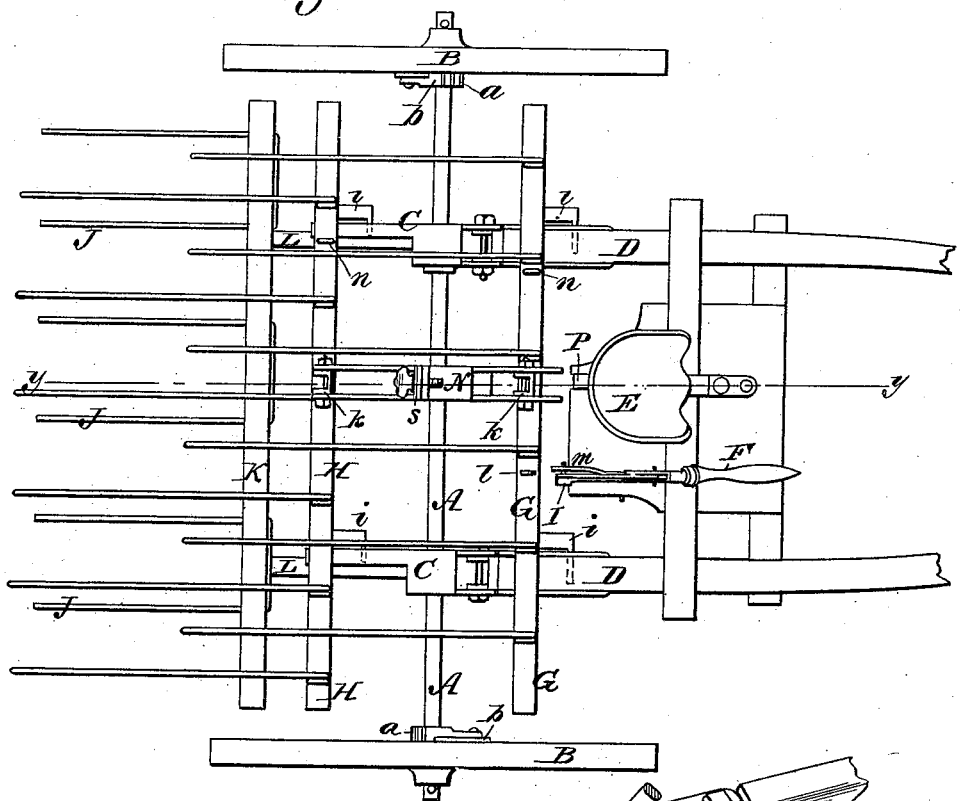
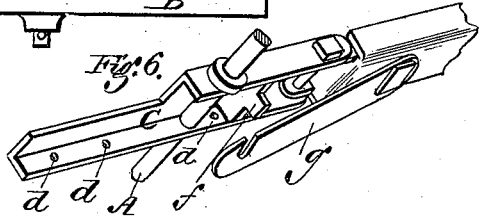
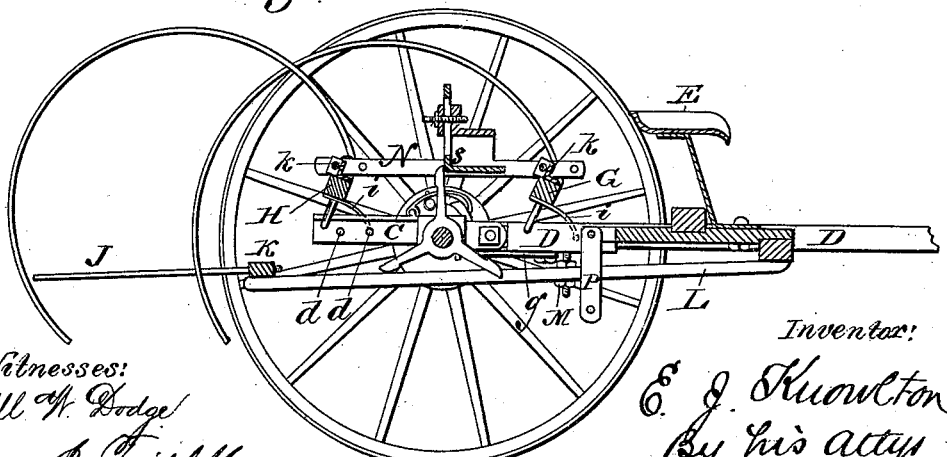
Witnesses:
Will W. Dodge
Donw P. Twitchell
Inventor:
E. J. Knowlton,
By his attys
Dodge & Son

UNITED STATES PATENT OFFICE.

ERNEST J. KNOWLTON, OF ANN ARBOR, MICHIGAN.

IMPROVEMENT IN COMBINED HAY RAKE AND TEDDER.

Specification forming part of Letters Patent No. 181,184, dated August 15, 1876; application filed May 3, 1876.

*To all whom it may concern:*

Be it known that I, ERNEST J. KNOWLTON, of Ann Arbor, in the county of Washtenaw and State of Michigan, have invented certain Improvements in Combined Hay Rake and Tedder, of which the following is a specification:

The object of my invention is to produce an implement which can be quickly and readily converted at will into a rake or a tedder, as required; and to this end it consists in a novel combination and arrangement of a wheeled frame, a rocking rake head or heads thereon, and devices whereby the head or heads may be given an automatic rising and falling motion at short intervals; in two rake-heads adapted for joint use as a single head in raking, or as separate heads in tedding; and in the construction of the frame, operating devices, and other details, as hereinafter described.

Figure 1 represents a top-plan view of my machine adjusted for use as a rake; Fig. 2, a longitudinal vertical section of the same on the line $x\ x$; Fig. 3, a view of the link by which the hand-lever is connected with the rake-head; Fig. 4, a top-plan view of the machine adjusted for use as a tedder; Fig. 5, a longitudinal vertical section of the same on the line $y\ y$; Fig. 6, a perspective view, illustrating the construction of the frame.

A represents a round axle, having its ends provided with ratchet-wheels $a$, and mounted loosely in supporting-wheels B, which are provided with pawls $b$, engaging in the ratchet-wheels for the purpose of turning the axle forward. On the middle of the axle there is secured a hub having three radial arms or cams, $c$, to actuate the tedding devices, as hereinafter described.

As it is desirable to have the axle and its arms $c$ stand still when the machine is employed as a rake, the ratchet-wheels $a$ are secured to the axle by keys, bolts, or other devices which will admit of their being readily released, so as to turn on the axle. On the axle, near its ends, I mount two tilting arms, C, each provided with a series of bolts, $d$, to receive the pivot-arms of the rake-heads, the series of holes being provided in order that the heads may be placed in different positions, according to the purpose for which the machine is to be employed. To the forward ends of the tilting or rocking arms C I hinge the rear ends of the thills D, which are connected, as usual in this class of machines, by cross-bars or sills, and a platform, on which the driver's seat E and the rake-operating hand-lever F are mounted, as shown.

The weight of the front frame and driver, being received upon the forward ends of the rocking arms C, tends to tip them upward at the rear ends; but as this is not desirable when the machine is used as a tedder, each arm C is provided with a stud, $f$, and the thills provided with corresponding hooks $g$, which may be engaged therewith, so as to lock the arms and thills rigidly together in line with each other, as shown in Figs. 5 and 6.

G and H represent the two rake-heads, each consisting of a wooden bar, provided with a series of curved wire rake-teeth, as usual, and also at the ends, with two downwardly-extending arms $i$, having lateral studs or pivots on their ends, to enter the before-mentioned holes $d$ in the arms C, as shown. The teeth of the head G are made longer than those of the head H, and are so arranged that, upon placing the two heads together side by side, the teeth of one will stand midway between those of the other, and that the points of all the teeth will stand in a single row or line, as shown in Figs. 1 and 2, in which position the two heads form jointly a single rake with teeth close together. Each rake-head is provided at its middle with a pair of ears, $k$, to receive a pivot pin or bolt, for purposes hereinafter described, and the head G also provided with an ear, $l$, to receive the link which connects with the hand-lever, as will be presently explained.

The hand-lever F is made of an angular form, and pivoted on the front frame by the side of the drivers's seat, and has pivoted to its middle the link or bar I, the rear end of which is provided, as shown in Figs. 1 and 3, with a lateral stud, to enter the ear $l$ on the rake-head, and with a pivoted latch, $m$, to shut down behind the ear and prevent the disengagement of the stud therefrom. The clearer-arms J, by which the hay is removed, as usual, from the rake-teeth as the latter rise, are mounted in a cross-bar, K, sustained by two longitudinal bars, L, which latter are connected at their forward ends to the thills, and sustained at their rear ends by nuts M, mounted on bolts secured to the under side of the thills, as shown in Figs. 2 and 5, so that by adjusting the nuts the clearer-arms may be raised and lowered, as required.

When the machine is to be employed as a rake the ratchet-wheels are released from the axle, the hooks $g$ released, so that the arms C can rock upon the axle, and the clearer-arms J elevated, so as to permit the proper accumulation of hay against the rake-teeth. The two rake-heads G and H are then placed together side by side, in the manner hereinbefore described, and mounted directly over the axle upon the rocking arms C, the pivots or studs on the arms $i$ of the rake-heads being inserted into the corresponding holes in the arms C, and secured therein by inserting pins $n$ down through the rake-heads by the side of the arms C, as shown, so as to prevent the heads from moving endwise.

In adjusting the rake-heads, care is taken to place one of the arms $c$ of the axle between them, so as to enter between ears $k$ on the head G, after which a bolt, $o$, is inserted through the ears and under a shoulder made for the purpose on the arm $c$, as shown in Figs. 1 and 2, so as to hold the head G down securely and firmly upon the rocking arms C. The link I of the hand-lever is then connected to the ear $l$ of the rake-head G, and the rake is ready for action.

When the hand-lever is thrown backward, the link locks past the center, and holds the rocking arms C in a horizontal position and the rake-teeth upon the ground, as represented in Fig. 2, so that as the machine advances the teeth gather the hay before them. On throwing the hand-lever forward, the rocking arms C are released and tilted on the axle, so as to tip the rake-heads and raise the rake-teeth.

It is obvious that when a coarse rake only is required, the head H may be removed from the machine and the head G used alone; but this is not considered desirable under ordinary circumstances.

When the machine is to be converted into a tedder, the ratchet-wheels are secured to the axle, the arms C fastened rigidly in a horizontal position by the hooks $g$, and the clearer-arms J lowered, so as to remove the hay upon the teeth rising a short distance, after which the rake-heads are separated and placed one on the rear ends of the arms C behind the axle, and the other on the rear ends of the thills forward of the axle, and then connected with each other by a bar, N, pivoted at its ends to the lugs or ears $k$ on the rake-heads, and provided at its middle with a plate or shoulder, $s$, against which the arms $c$ of the axle strike as they revolve, all as clearly shown in Figs. 4 and 5.

The rake-heads are secured in place, as in the previous instance, by inserting the pivots or studs on their arms $i$ into corresponding holes; but instead of being held fast upon their supports, as before, they are left free to rock or tip upon the pivots of their arms in order to raise their teeth. As the machine advances the arms $c$ on the axle, striking against the plate or shoulder $s$, move the bar N endwise, and cause it to raise both sets of teeth at frequent intervals, the intervals being of such length that the teeth effectually turn and scatter the hay upon the ground.

In order that the teeth may be raised to a greater or less height, according to the thickness of the mass of hay, the plate $s$, against which the arms or cams $c$ act, is secured by a thumb-screw and made adjustable vertically, so that it may be set in position to receive the pressure of the arms for a greater or a less length of time. When operating the tedder in fields having a light crop of hay, it may be desirable to use but one set of teeth, in which case the forward head G is removed and the forward end of the bar N sustained by a link, P, hinged to the front frame, this link being shown in a pendent position in Figs. 1, 2, 4, and 5.

It is obvious that the rake-heads may be pivoted in place otherwise than by the lateral studs on the arms $i$, and also that, in place of the hooks $g$, sliding bolts, transverse pins, or other devices may be employed to lock the arms C and the thills rigidly together.

Having described my invention, what I claim is—

1. In combination with a wheeled main frame, two changeable rake-heads, G and H, adapted to be used jointly as a single rake-head, or independently as two separate tedding heads and devices, substantially such as shown and described for operating said heads.

2. In combination with a wheeled main frame, a changeable rocking rake-head, capable of being shifted forward and backward on the frame, so as to operate upon the front or the rear end thereof, substantially as shown and described.

3. In combination with the frame provided with holes $d$, a changeable rake-head provided with arms $i$, having lateral pivots or studs to enter said holes.

4. The combination of the two rocking rake-heads G and H, mounted on the frame, and connected by the bar N with the arms or cams $c$, secured to the axle A, as shown.

5. In combination with the changeable rake head or heads, the arms C, mounted on the axle A, the thills D, hinged to the forward ends of said arms, and the hooks $g$, or equivalent devices, whereby the arms and thills may be locked rigidly together.

6. In combination with the arms $c$ and the bar N, arranged to operate as shown, the adjustable plate $s$, as and for the purpose described.

7. In combination with a removable rake-head, G, the hand-lever F, provided with the link I, having its rear end provided with the lateral stud and the latch $m$.

8. In combination with the bar $k$, having the clearer-arms J attached thereto, the arms or bars I, connected at their forward ends to the main frame, and sustained at their rear ends by the nuts M, mounted on bolts secured to the main frame, as shown.

9. The combination of the arms C, mounted on the axle and hinged to the thills D, hooks $g$, arms $c$, changeable rake-heads G and H, bar N, and hand-lever F, all constructed and adapted for the uses described and shown, whereby the machine is rendered capable of a transformation into a rake or a tedder, as required.

10. In combination with a wheeled main frame, an adjustable rocking rake-head and adjustable devices, substantially such as shown and described for operating said head, whereby it may be operated at will to gather the hay into windrows, or operated automatically to spread the hay upon the ground.

ERNEST JOHN KNOWLTON.

Witnesses:
D. J. LOOMIS,
HENRY S. HARRIS.